(12) United States Patent
Jackson

(10) Patent No.: US 10,935,640 B2
(45) Date of Patent: Mar. 2, 2021

(54) MULTIPLEXED LIDAR TRANSCEIVER

(71) Applicant: Microvision, Inc., Redmond, WA (US)

(72) Inventor: Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 394 days.

(21) Appl. No.: 15/962,924

(22) Filed: Apr. 25, 2018

(65) Prior Publication Data

US 2019/0331774 A1 Oct. 31, 2019

(51) Int. Cl.
| | | |
|---|---|---|
| *G01S 7/48* | (2006.01) | |
| *G01S 7/4863* | (2020.01) | |
| *G01S 7/481* | (2006.01) | |
| *G01S 17/89* | (2020.01) | |

(52) U.S. Cl.
CPC .......... *G01S 7/4863* (2013.01); *G01S 7/4816* (2013.01); *G01S 7/4817* (2013.01); *G01S 17/89* (2013.01)

(58) Field of Classification Search
CPC ..... G01S 7/4863; G01S 7/4816; G01S 7/4817
USPC ........................................................ 356/5.01
See application file for complete search history.

(56) References Cited

U.S. PATENT DOCUMENTS

| | | | | |
|---|---|---|---|---|
| 2010/0033691 | A1* | 2/2010 | Hung | H04N 9/317 353/70 |
| 2016/0289043 | A1* | 10/2016 | Fang | B66B 1/3461 |
| 2016/0306043 | A1* | 10/2016 | Moss | G01S 17/42 |
| 2017/0153319 | A1* | 6/2017 | Villeneuve | H01S 3/08086 |
| 2018/0095175 | A1* | 4/2018 | O'Keeffe | G01S 17/89 |
| 2018/0136318 | A1* | 5/2018 | Uyeno | G02F 1/292 |
| 2018/0275274 | A1* | 9/2018 | Bao | G01S 17/89 |

* cited by examiner

*Primary Examiner* — James R Hulka
(74) *Attorney, Agent, or Firm* — Kevin D. Wills

(57) ABSTRACT

A scanning light detection and ranging (LIDAR) system includes a scanning apparatus that scans laser light pulses sinusoidally in a vertical direction, and quasi-statically through angular extents in a horizontal direction. Multiple light sensors, each with a substantially nonoverlapping field of view, are multiplexed during the scan of the laser light pulses. Multiple scanning LIDAR systems may be combined to increase the effective horizontal angular extents.

18 Claims, 12 Drawing Sheets

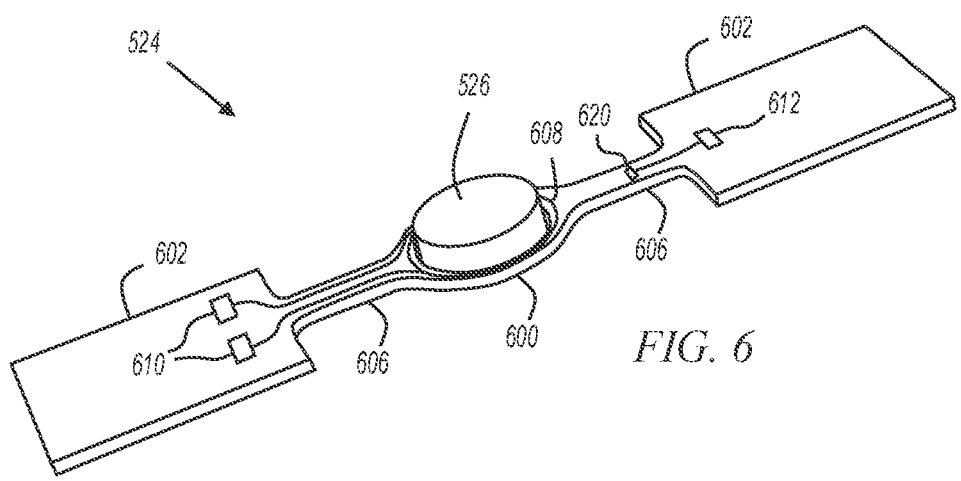
FIG. 6
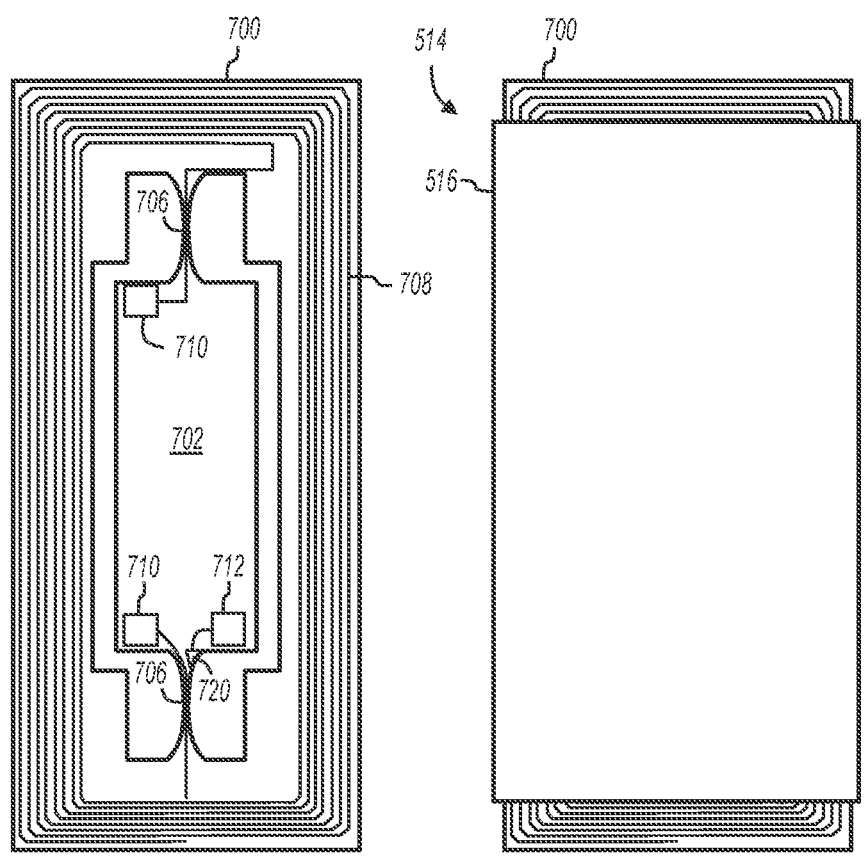
FIG. 7A
FIG. 7B

US 10,935,640 B2

MULTIPLEXED LIDAR TRANSCEIVER

FIELD

The present invention relates generally to light detection and ranging systems, and more specifically to scanning light detection and ranging systems.

BACKGROUND

Light detection and ranging (LIDAR) systems typically employ laser light sources and sensors to determine distances by measuring round trip times of flight (TOF) of laser light pulses. The sensors can be susceptible to various forms of interference, including from other nearby laser light sources and from ambient light. Sensors with large fields of view are typically more prone to interference, in part because they are able to collect light from a larger area.

BRIEF DESCRIPTION OF THE DRAWINGS

FIG. 6 shows a perspective view of a MEMS device with a scanning mirror in accordance with various embodiments of the present invention;

FIGS. 7A and 7B show plan views of a MEMS device with a scanning mirror in accordance with various embodiments of the present invention;

DESCRIPTION OF EMBODIMENTS

Figure 1:
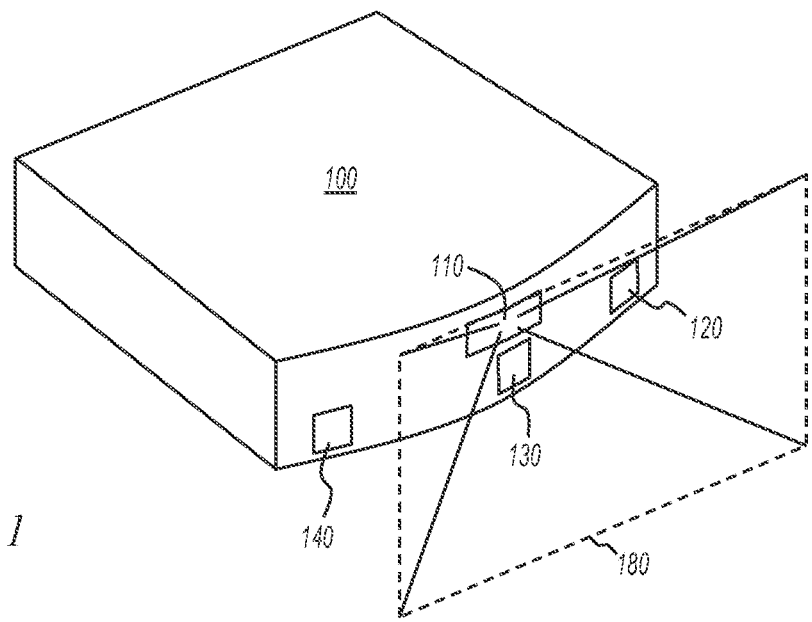
FIG. 1 shows a perspective view of a scanning light detection and ranging system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a perspective view of a scanning light detection and ranging system in accordance with various embodiments of the present invention. Scanning light detection and ranging (LIDAR) system 100 includes a scanner 110 and three light sensors 120, 130, and 140. In operation, LIDAR system 100 scans laser light pulses (also referred to herein as "transmit pulses") in a field of view 180, and light sensors 120, 130, and 140 are used to detect laser light reflections from points within the field of view 180 to determine the distance (range) to the reflection points. In the example shown in FIG. 1, the field of view 180 is nominally 90 degrees, and the field of view of each sensor 120, 130, and 140 is nominally 30 degrees.

As further described below, in some embodiments, scanner 110 scans sinusoidally at a resonant frequency on a first axis, and scans nonsinusoidally at a nonresonant frequency on a second axis. The angular extents of the nonsinusoidal scan is controlled by a control circuit (described further below), and may be programmable. The horizontal angular extents define the horizontal field of view of scanner 110.

Sensors 120, 130, and 140 each have a substantially nonoverlapping field of view that is less than the field of view of scanner 110. As used herein, the term "substantially nonoverlapping" refers to sensor fields of view that do not overlap or that overlap a small amount such that the entire scanner field of view is covered by one or more sensor fields of view. For example, in some embodiments, sensors 120, 130, and 140 include optical devices that create nonoverlapping fields of view for each sensor. In the example of FIG. 1, the scanner field of view 180 is substantially 90 degrees, and the field of view of each of sensors 120, 130, and 140 are substantially 30 degrees.

Figure 2:
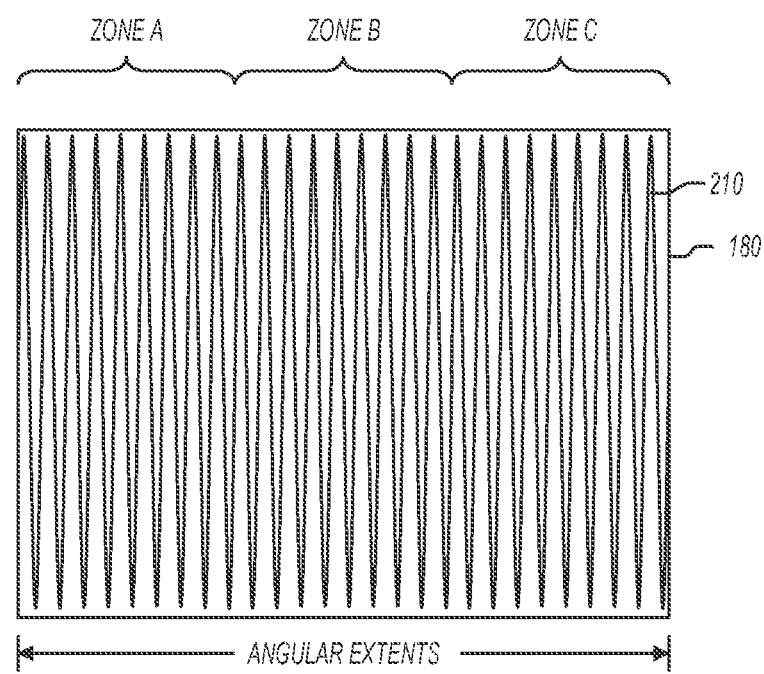
FIG. 2 shows a scanning trajectory with multiple non-overlapping zones in accordance with various embodiments of the present invention.

FIG. 2 shows a scanning trajectory with multiple non-overlapping zones in accordance with various embodiments of the present invention. Scanning trajectory 210 is an example trajectory produced by scanner 110. In operation, laser light pulses are transmitted by LIDAR system 100 along trajectory 210 as scanner 110 scans sinusoidally in the vertical dimension and nonsinusoidally in the horizontal dimension.

The three zones shown in FIG. 2 (Zone A, Zone B, Zone C) correspond to the fields of view of sensors 120, 130, and 140. For example, sensor 120 has a field of view that collects light from Zone A, sensor 130 has a field of view that collects light from Zone B, and sensor 140 has a field of view that collects light from Zone C.

In some embodiments, the sensors are electrically coupled to a time of flight (TOF) detection circuit within LIDAR system 100, and the electrical coupling is time multiplexed such that each sensor is enabled only when transmit pulses are in the corresponding zone. For example, sensor 120 may be enabled when pulses are transmitted in Zone A, sensor 130 may be enabled when pulses are transmitted in Zone B, and sensor 140 may be enabled when pulses are transmitted in Zone C. These and other embodiments are more fully described below with reference to the remaining figures.

Figure 3:
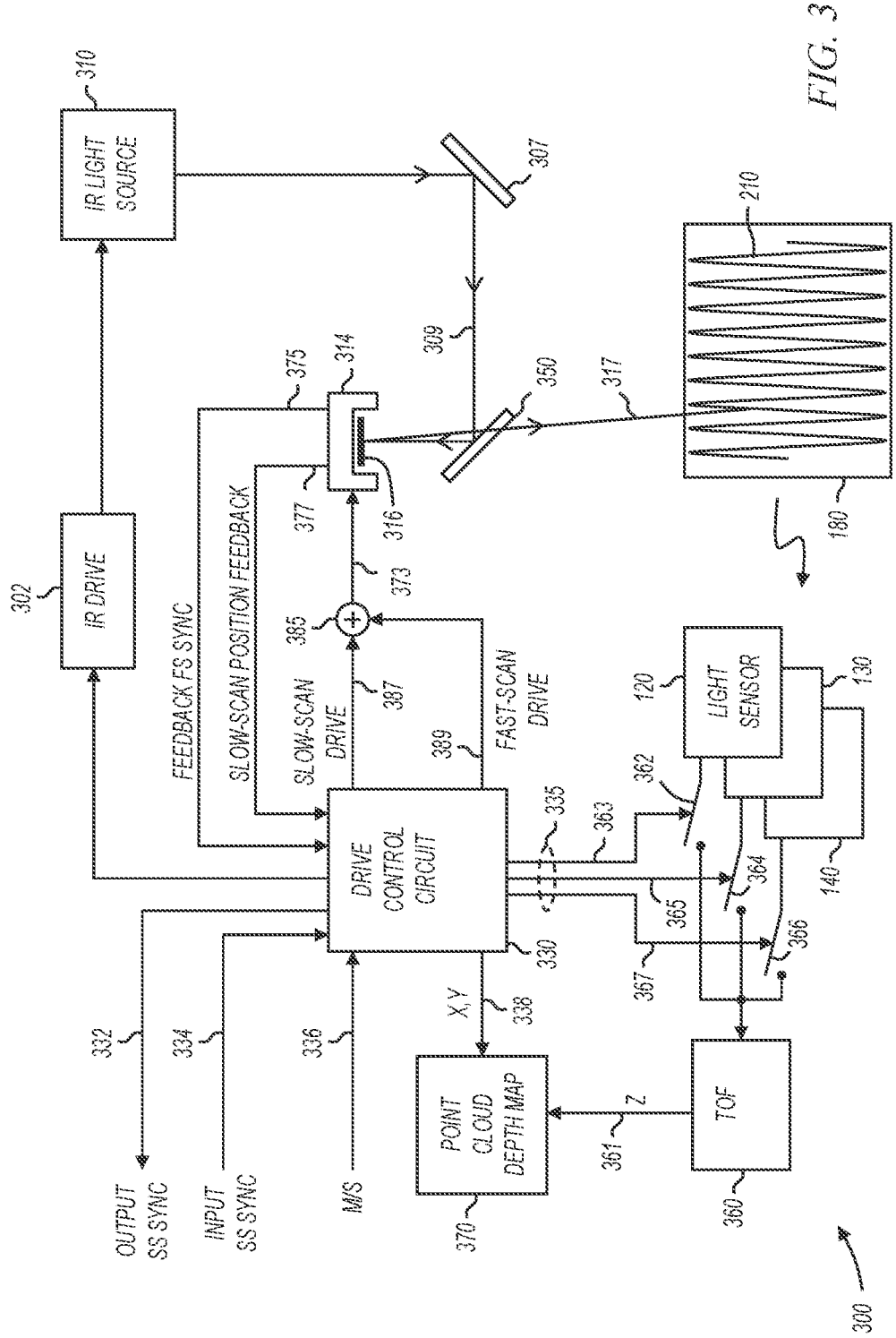
FIG. 3 shows a scanning light detection and ranging system in accordance with various embodiments of the present invention.

FIG. 3 shows a scanning light detection and ranging system in accordance with various embodiments of the present invention. Scanning LIDAR system 300 is an example implementation of LIDAR system 100 (FIG. 1). Scanning LIDAR system 300 includes infrared (IR) drive circuit 302, IR light source 310, optical devices 307 and 350, microelectromechanical (MEMS) device 314 with scanning mirror 316, drive control circuit 330, summer 385, light sensors 120, 130, and 140, switches 362, 364, and 366, TOF detection circuit 360, and point cloud depth map storage 370. In embodiments represented by FIG. 3, MEMS device 314 with scanning mirror 316 corresponds to scanner 110 (FIG. 1).

Light sensors 120, 130, and 140 may be implemented using any suitable light detecting device. For example, in some embodiments, the light sensors may be implemented by PIN photodiodes, Silicon photomultipliers (SiPM), or avalanche photodiodes (APD). IR light source 310 may be a laser light source such as a laser diode or the like, capable of emitting a laser beam 309.

In some embodiments, IR light source 310 sources nonvisible light such as infrared (IR) light. In these embodiments, light sensors 120, 130, and 140 are able to detect the same wavelength of nonvisible light. For example, in some embodiments, IR light source 310 may be an infrared laser diode that produces light with a wavelength of substantially 808 nanometers (nm), and the light sensors detect light of the same wavelength. The wavelength of light is not a limitation of the present invention. Any wavelength, visible or nonvisible, may be used without departing from the scope of the present invention.

In operation, IR drive circuit 302 drives IR light source 310 in response to signals received from drive control circuit 330. IR light source 310 emits laser light pulses 309 that are directed to scanning mirror 316 via optical devices 307 and 350. IR drive circuit 302 may be implemented using any suitable circuit elements. For example, in some embodiments, IR drive circuit 302 includes digital-to-analog converters, amplifiers, voltage-to-current converters, and the like.

In some embodiments, scanning mirror 316 is an ultrahigh speed gimbal mounted two dimensional bi-axial scanning mirror. In some embodiments, this bi-axial scanning mirror is fabricated from silicon using MEMS processes. In some embodiments, as described below with reference to FIG. 5, two independent MEMS mirrors are employed in a combined optical system, each responsible for one of the scan axes. One axis of rotation is operated quasi-statically and creates a sawtooth raster trajectory. This axis is also referred to as the slow-scan axis. The second axis of rotation is orthogonal to the first and is operated on a resonant vibrational mode of the scanning mirror.

In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention. In some embodiments, the slow-scan axis corresponds to the horizontal axis and the fast-scan axis corresponds to the vertical axis, although this is not a limitation of the present invention. For example, a rotation of the projector may result in the fast-scan axis being the horizontal axis and the slow-scan axis being the vertical axis.

In some embodiments, raster scan 210 is formed by combining a sinusoidal component on the vertical fast-scan axis and a sawtooth component on the horizontal slow-scan axis. In these embodiments, output beam 317 sweeps vertically (up and down top-to-bottom) in a sinusoidal pattern, and sweeps horizontally (left-to-right) in a sawtooth pattern that flies back right-to-left. FIG. 3 shows the sinusoidal pattern as the beam sweeps horizontally left-to-right, but does not show the flyback from right-to-left. In other embodiments, the horizontal sweep is controlled with a triangular wave such that there is no flyback. In still further embodiments, the horizontal sweep is a non-symmetric scanning pattern. The various embodiments of the invention are not limited by the waveforms used to control the vertical and horizontal sweep or the resulting raster pattern.

A mirror drive control circuit 330 provides a slow-scan drive signal on node 387 and a fast-scan drive signal on node 389. The fast-scan drive signal on node 389 includes an excitation signal to control the resonant angular motion of scanning mirror 316 on the fast-scan axis, and the slow-scan drive signal on node 387 includes an excitation signal to cause deflection on the slow-scan axis. The slow-scan and fast-scan drive signals are combined by summer 385 to produce a drive signal on node 373 used to drive MEMS device 314. The resulting mirror deflection on both the fast and slow-scan axes causes output beam 317 to generate a raster scan 210 in field of view 180. In operation, IR light source 310 produces a light pulse for each point to be measured in the field of view, and scanning mirror 316 reflects the light pulses as beam 317 traverses the raster pattern.

Drive control circuit 330 receives a feedback fast-scan sync (FS SYNC) signal from MEMS device 314 on node 375, and also receives a slow-scan position feedback signal on node 377. The feedback FS SYNC signal on node 375 provides information regarding the position of scanning mirror 316 on the fast-scan axis as it oscillates at a resonant frequency. In some embodiments, the feedback FS SYNC signal describes the instantaneous angular position of the mirror, and in other embodiments, the feedback signal describes the maximum deflection angle of the mirror. The slow-scan position feedback signal on node 377 provides information regarding the position of scanning mirror 316 on the slow-scan axis.

In some embodiments, the slow-scan position feedback signal is used to phase lock movement on the slow-scan axis to the period of the input slow-scan sync (INPUT SS SYNC) signal received on node 334. In these embodiments, the frequency of movement on the slow-scan axis is dictated by a received sync signal (in this case, the INPUT SS SYNC). In some embodiments, this is controlled by the master/slave (M/S) signal received on node 336. For example, if drive control circuit 330 is operating as a master device, it does not phase lock operation to the INPUT SS SYNC, and if drive circuit 330 is operating as a slave device, it does phase lock operation to the INPUT SS SYNC. Drive control circuit 330 also produces an OUTPUT SS SYNC on node 332 to which other LIDAR systems may phase lock. Further, in some embodiments, the slow-scan position feedback signal and/or the INPUT SS SYNC signal is used to phase lock operation of sensor enable signals 335 to time multiplex the use of sensors 120, 130, and 140.

In some embodiments, MEMS device 314 includes one or more analog-to-digital converters to digitize sensed position information. In these embodiments, either or both of the feedback FS SYNC signal and the slow-scan position feedback signal are digital representations of the mirror position on the two axes. In other embodiments, the feedback signals are analog signals, and drive control circuit 330 includes one or more analog-to-digital converters to digitize the feedback signals as appropriate.

In operation, drive control circuit 330 excites resonant motion of scanning mirror 316 such that the amplitude of the scanned beam is held constant on the fast-scan axis. This provides for a constant maximum angular deflection on the fast-scan axis as shown in raster scan 210. Further, drive control circuit 330 excites motion of scanning mirror 316 on the slow-scan axis to cause scanning mirror 316 to scan through the horizontal angular extents.

Drive control circuit 330 is implemented using functional circuits such as phase lock loops (PLLs), filters, adders, multipliers, registers, processors, memory, and the like. Accordingly, drive control circuit 330 may be implemented in hardware, software, or in any combination. For example, in some embodiments, drive control circuit 330 is implemented in an application specific integrated circuit (ASIC). Further, in some embodiments, some of the faster data path control is performed in an ASIC and overall control is software programmable. Examples of drive control circuit implementations are described further below.

Time-of-flight (TOF) detection circuit 360 is electrically coupled to one of sensors 120, 130, or 140, and measures a round-trip time-of-flight of a transmit pulse that has reflected off an object in the field of view. For example, when switch 362 is closed, light sensor 120 is electrically coupled to TOF detection circuit 360, when switch 364 is closed, light sensor 130 is electrically coupled to TOF detection circuit 360, and when switch 366 is closed, light sensor 140 is electrically coupled to TOF detection circuit. Switches 362, 364, and 366 are controlled by sensor enable signals 363, 365, and 367, respectively. The sensor enable signals are sourced by drive control circuit 330 and are described more fully below with reference to later figures. TOF detection circuit 360 is implemented using functional circuits such as amplifiers, comparators, integrators, counters, adders, multipliers, registers, processors, memory, and the like.

Although three light sensors shown in FIG. 3, the various embodiments of the invention are not limited by the number of light sensors. For example, in some embodiments less than three light sensors are included, and in other embodiments, more than three light sensors are included. Further, switches are shown electrically coupling a plurality of light sensors to a signal TOF detection circuit, although this is not a limitation of the present invention. For example, some embodiments include a one-to-one pairing of light sensors to TOF detection circuits. Switches, when they are included, may be implemented using suitable analog or digital devices, such as field effect transistors (FETs), multiplexers, or the like.

Point cloud depth map storage 370 receives and stores three dimensional (3D) data (X,Y,Z) that represents points in 3D space. The X,Y coordinates are sourced by drive control circuit 330, and the Z coordinate is sourced by TOF detection circuit 360. In some embodiments, the 3D data is represented in a cylindrical coordinate system, and in other embodiments, the 3D data is represented in a polar coordinate system. The coordinate system used to store the point cloud depth map is not a limitation of the present invention.

Point cloud depth map storage 370 may be implemented using any suitable circuit structure. For example, in some embodiments, point cloud depth map storage 370 is implemented in a dual port memory device that can be written on one port and read on a second port. In other embodiments, point cloud depth map storage 370 is implemented as data structures in a general purpose memory device. In still further embodiments, point cloud depth map storage 370 is implemented in an application specific integrated circuit (ASIC).

Figure 4:
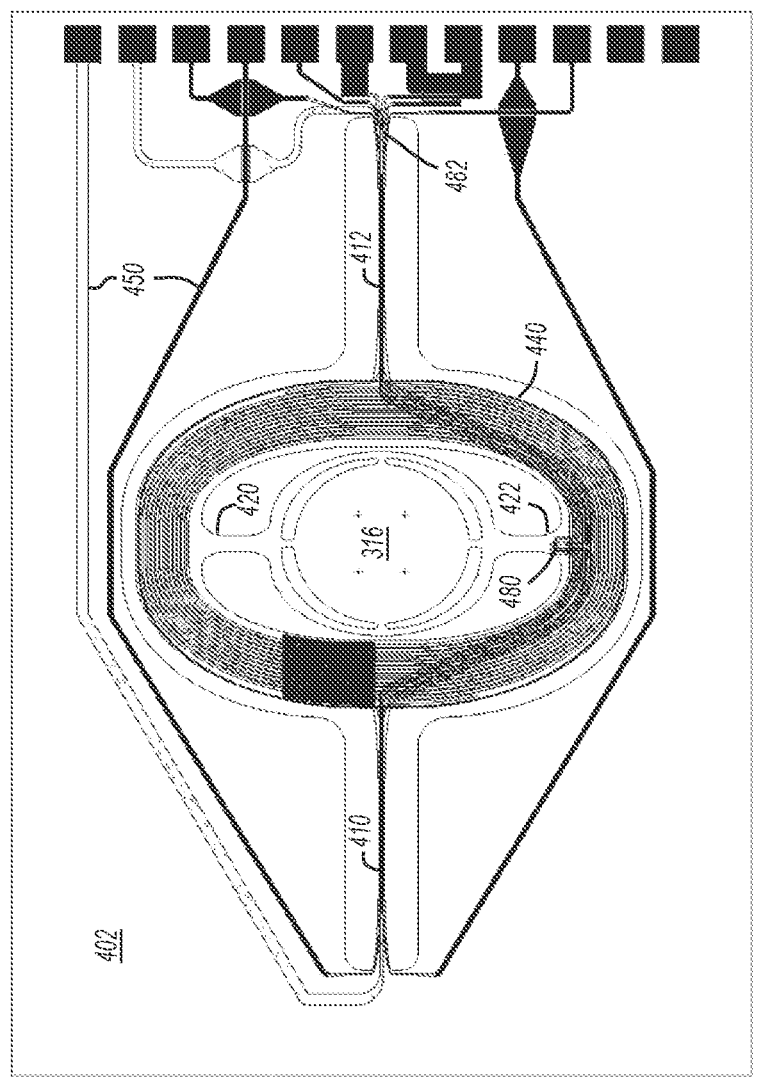
FIG. 4 shows a plan view of a microelectromechanical system (MEMS) device with a scanning mirror in accordance with various embodiments of the present invention.

FIG. 4 shows a plan view of a microelectromechanical system (MEMS) device with a scanning mirror. MEMS device 314 includes fixed platform 402, scanning platform 440, and scanning mirror 316. Scanning platform 440 is coupled to fixed platform 402 by flexures 410 and 412, and scanning mirror 316 is coupled to scanning platform 440 by flexures 420 and 422. Scanning platform 440 has a drive coil connected to drive lines 450, which are driven by a drive signal provided on node 373 from summer 385 (FIG. 3). The drive signal includes an excitation signal to excite resonant motion of scanning mirror 316 on the fast-scan axis, and also includes a slow-scan drive signal to cause non-resonant motion of scanning platform 440 on the slow-scan axis. Current driven into drive lines 450 produces a current in the drive coil.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 440, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 410 and 412 form a pivot axis. Flexures 410 and 412 are flexible members that undergo a torsional flexure, thereby allowing scanning platform 440 to rotate on the pivot axis and have an angular displacement relative to fixed platform 402. Flexures 410 and 412 are not limited to torsional embodiments as shown in FIG. 4. For example, in some embodiments, flexures 410 and 412 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 316 pivots on a first axis formed by flexures 420 and 422, and pivots on a second axis formed by flexures 410 and 412. The first axis is referred to herein as the vertical axis or fast-scan axis, and the second axis is referred to herein as the horizontal axis or slow-scan axis. The distinction between vertical and horizontal is somewhat arbitrary, since a rotation of the scanning mirror will cause a rotation of the two axes. Accordingly, the various embodiments of the present invention are not to be limited by the terms "horizontal" and "vertical."

In some embodiments, scanning mirror 316 scans at a mechanically resonant frequency on the fast-scan axis resulting in a sinusoidal vertical sweep. Further, in some embodiments, scanning mirror 316 scans at a non-resonant frequency on the slow-scan axis, so the horizontal scan frequency and angular extents can be controlled independently.

MEMS device 314 also incorporates one or more integrated piezoresistive position sensors. Piezoresistive sensor 480 produces a voltage that represents the displacement of mirror 316 with respect to scanning platform 440, and this voltage is provided as the feedback FS SYNC signal on node 375 (FIG. 3). Piezoresistive sensor 482 produces a voltage that represents the displacement of scanning platform 440 with respect to fixed platform 402, and this voltage is provided as the slow-scan position feedback signal on node 377 (FIG. 3). As shown in FIG. 4, in some embodiments, position sensors are provided on both scan axes, although this is not a limitation of the present invention. For example, in some embodiments, MEMS device 314 includes a position sensor on only one axis. In some embodiments, one or more analog-to-digital converters are included to digitize the voltages produced by the piezoresistive position sensors. In these embodiments, one or both of the FS SYNC signal and slow-scan position feedback signal are provided as streams of digital data.

The particular MEMS device embodiment shown in FIG. 4 is provided as an example, and the various embodiments of the invention are not limited to this specific implementation. For example, any combination of scanning mirrors capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 314 uses a drive coil on a moving platform with a static magnetic field, other embodiments may include a magnet on a moving platform with drive coil on a fixed platform. Further, the mirror drive mechanism may include an electrostatic and/or a piezoelectric drive mechanism.

Figure 5:
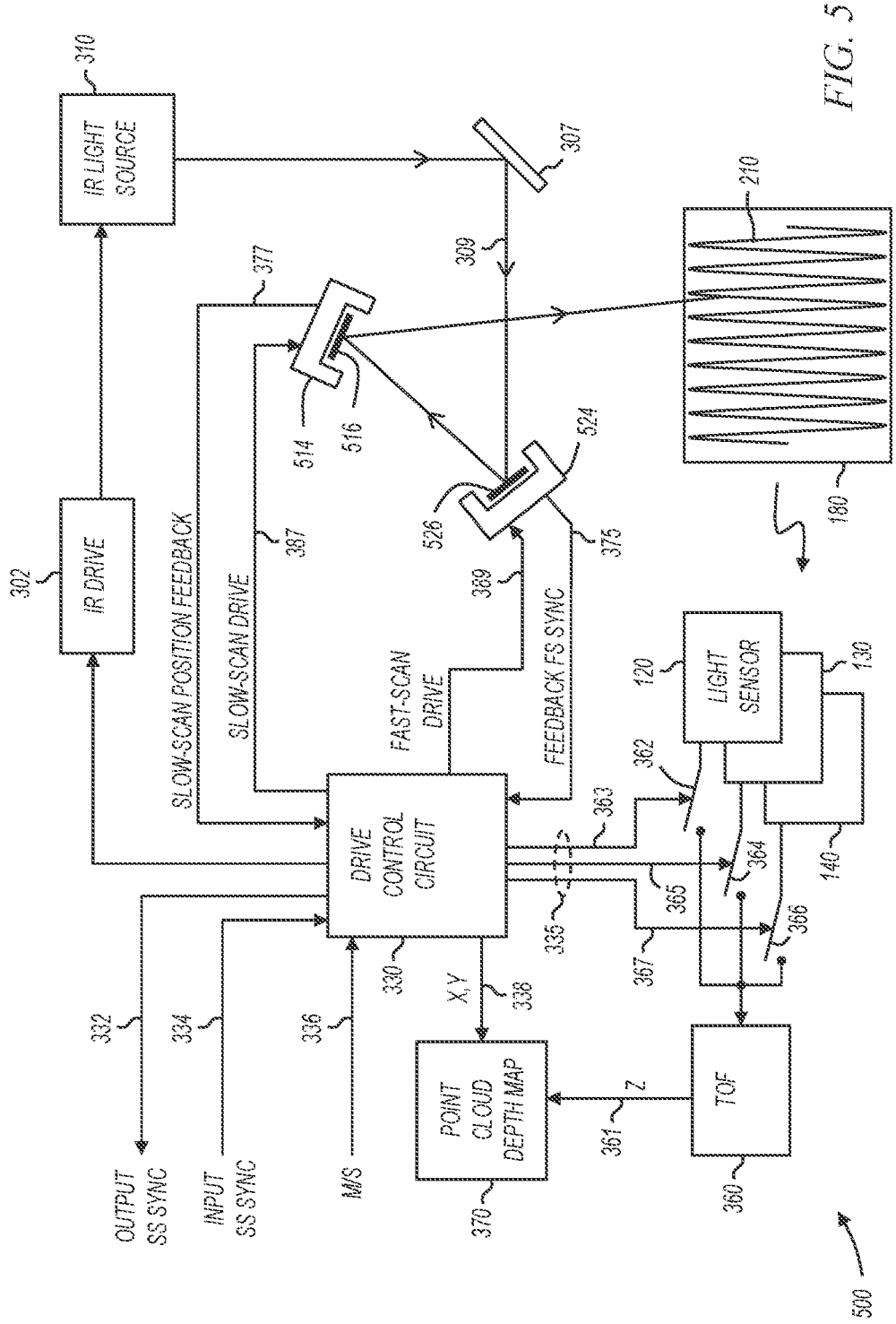
FIG. 5 shows a light detection and ranging system in accordance with various embodiments of the present invention.

FIG. 5 shows a light detection and ranging system in accordance with various embodiments of the present invention. Scanning LIDAR system 500 is an example implementation of LIDAR system 100 (FIG. 1). Scanning LIDAR system 500 is similar to scanning LIDAR system 300 (FIG. 3) with the exception that two scanning mirrors are present instead of one. In some embodiments, a first MEMS device 524 includes a scanning mirror 526 configured to deflect along one axis and a second MEMS device 514 includes a scanning mirror 516 configured to deflect along a second axis that is largely perpendicular to the first axis. Furthermore, in some embodiments, the first mirror is used for fast-scan motion, while the second mirror is used for slow-scan motion. In some embodiments, the fast-scan motion comprises resonant sinusoidal motion while the slow-scan motion comprises non-resonant quasi-static controlled motion. In embodiments represented by FIG. 5, the combination of MEMS device 514 and MEMS device 524 with their respective scanning mirrors corresponds to scanner 110 (FIG. 1).

Drive control circuit 330 provides a fast-scan drive signal to MEMS device 524 on node 389 to excite motion of mirror 526, and receives the feedback FS SYNC signal on node 375. Drive circuit 330 also provides a slow-scan drive signal to MEMS device 514 on node 387 to excite motion of mirror 516 and receives a slow-scan position feedback signal on node 377. Mirror 516 scans through the horizontal angular extents.

FIG. 6 shows a perspective view of a MEMS device with a scanning mirror in accordance with various embodiments of the present invention. MEMS device 524 includes fixed platforms 602, scanning platform 600, and scanning mirror 526. Scanning platform 600 is coupled to fixed platforms 602 by flexures 606. Scanning platform 600 has a drive coil 608 connected to contacts 610, which are driven by a fast-scan drive signal provided on node 389 from drive control circuit 330 (FIG. 5).

The axis of flexures 606 forms a pivot axis. Flexures 606 are flexible members that undergo a torsional flexure, thereby allowing scanning platform 600 to rotate on the pivot axis and have an angular displacement relative to fixed platforms 602. Flexures 606 are not limited to torsional embodiments as shown in FIG. 6. For example, in some embodiments, flexures 606 take on other shapes such as arcs, "S" shapes, or other serpentine shapes.

In operation, an external magnetic field source (not shown) imposes a magnetic field on the drive coil. The magnetic field imposed on the drive coil by the external magnetic field source has a component in the plane of the coil. The in-plane current in the coil windings interacts with the in-plane magnetic field to produce out-of-plane Lorentz forces on the conductors. Since the drive current forms a loop on scanning platform 600, the current reverses sign across the scan axis. This means the Lorentz forces also reverse sign across the scan axis, resulting in a torque in the plane of and normal to the magnetic field. This combined torque produces a response on the scan axis depending on the frequency content of the torque. In some embodiments, scanning platform 600 and mirror 526 scan at a mechanically resonant frequency on the fast-scan axis resulting in a sinusoidal sweep.

MEMS device 524 also incorporates one or more integrated piezoresistive position sensors. Piezoresistive sensor 620 produces a voltage that represents the displacement of scanning platform 600 and mirror 526 with respect to fixed platforms 602. Piezoresistive sensor 620 is coupled to contact 612. The voltage on contact 612 is provided as the feedback FS SYNC signal on node 375 (FIG. 5). In some embodiments, the FS SYNC signal is provided as an analog signal. In other embodiments, the FS SYNC signal is digitized using a comparator (not shown) or an analog-to-digital converter (not shown) such that a digital feedback signal is provided on node 375 (FIG. 5).

Much of MEMS device 524 can be fabricated from a single common substrate using MEMS techniques. For example, the fixed platforms 602, the scanning platform 600 and the two flexures 606 can all be formed from the same substrate. Additionally, in some embodiments, the drive coil 608 and contacts 610 and 612 can also be formed with any suitable MEMS technique. For example, the drive coil 608 and contacts 610 and 612 can be formed by the selective deposition and patterning of conductive materials on the substrate.

FIGS. 7A and 7B show plan views of a MEMS device with a scanning mirror in accordance with various embodiments of the present invention. MEMS device 514 includes a stationary mount portion 702, a movable portion 700, two flexures 706, coil traces 708, and contacts 710. In operation, the movable portion 700 facilitates the motion of the attached mirror 516 to facilitate scanning in a laser scanning device.

The stationary mount portion 702 is located in a central portion of the MEMS device 514. The stationary mount portion 702 is configured to be mounted to a die carrier in a scanner assembly (not shown in FIG. 7) or other suitable device.

The movable portion 700 substantially surrounds the stationary mount portion 702 and is coupled to the mirror 516 through attachment structures (not shown). In some embodiments, the attachment structures serve to offset the mirror 516 away from the movable portion 700. This offset of the mirror 516 away from the movable portion 700 allows the mirror 516 to rotate with defined angular extents without impacting the stationary mount portion 702.

The movable portion 700 includes coil traces 708 while the stationary mount portion 702 includes various contacts 710 and 712. The coil traces 708 are configured to interact with applied magnetic fields and generate non-resonant or quasi-static motion. In some embodiments, coil traces 708 circumscribe the stationary mount portion 702 so that the stationary mount portion 702 is located substantially in the center of the coil traces 708; however, this is not a limitation of the present invention. In some embodiments, separate and independent coil traces on either side of the stationary mount portion 702 are used. In further embodiments, coil traces are formed on the attachment structures (not shown).

Contacts 710 and 712 provide electrical connections between the movable portion 700 and stationary portion 702. Contacts 710 provide electrical connections to coil traces 708, and contact 712 provides an electrical connection to position sensor 720.

The two flexures 706 are located on opposing sides of the stationary mount portion 702 and extend outwardly from the stationary mount portion 702 to the movable portion 700 to form a pivot axis. So configured, the two flexures 706 flexibly couple the stationary mount portion 702 to the movable portion 700 to facilitate movement of the movable portion 700 with respect to the stationary mount portion 702 along the pivot axis. Specifically, the two flexures 706 allow the movable portion 700 and the mirror 516 to rotate about the pivot axis. This rotation of the mirror 516 facilitates the use of the mirror 516 to reflect a laser beam through angular extents in a scan pattern.

During operation, drive control circuit 330 (FIG. 5) provides a slow-scan drive signal to the coil trace 708 through contacts 710. The applied slow-scan drive signal creates electromagnetic interactions between the coil trace 708 and an applied magnetic field, and those interactions excite motion of the movable portion 700 and the attached mirror 516. The resulting motion of mirror 516 can be configured to reflect laser light into a pattern of scan lines, and thus can facilitate laser depth sensing.

MEMS device 514 also incorporates one or more integrated piezoresistive position sensors 720. Piezoresistive sensor 720 produces a voltage that represents the displacement of mirror 516 with respect to stationary portion 702, and this voltage is provided as the slow-scan position feedback signal on node 377 (FIG. 5). In some embodiments, the slow-scan position feedback signal is provided as an analog signal. In other embodiments, the slow-scan position feedback signal is digitized using an analog-to-digital converter (not shown) such that a digital feedback signal is provided on node 377 (FIG. 5).

Much of MEMS device 514 can be fabricated from a single common substrate using MEMS techniques. Thus, the stationary mount portion 702, the movable portion 700 and the two flexures 706 can all be formed from the same substrate. Additionally, in some embodiments attachment structures can also be formed from the same substrate, while in other embodiments the attachment structures are formed separately or as part of the mirror 516. The coil traces 708 and contacts 710 and 712 can also be formed with any suitable MEMS technique. For example, the coil traces 708 and contacts 710 and 712 can be formed by the selective deposition and patterning of conductive materials on the substrate.

Figure 8:
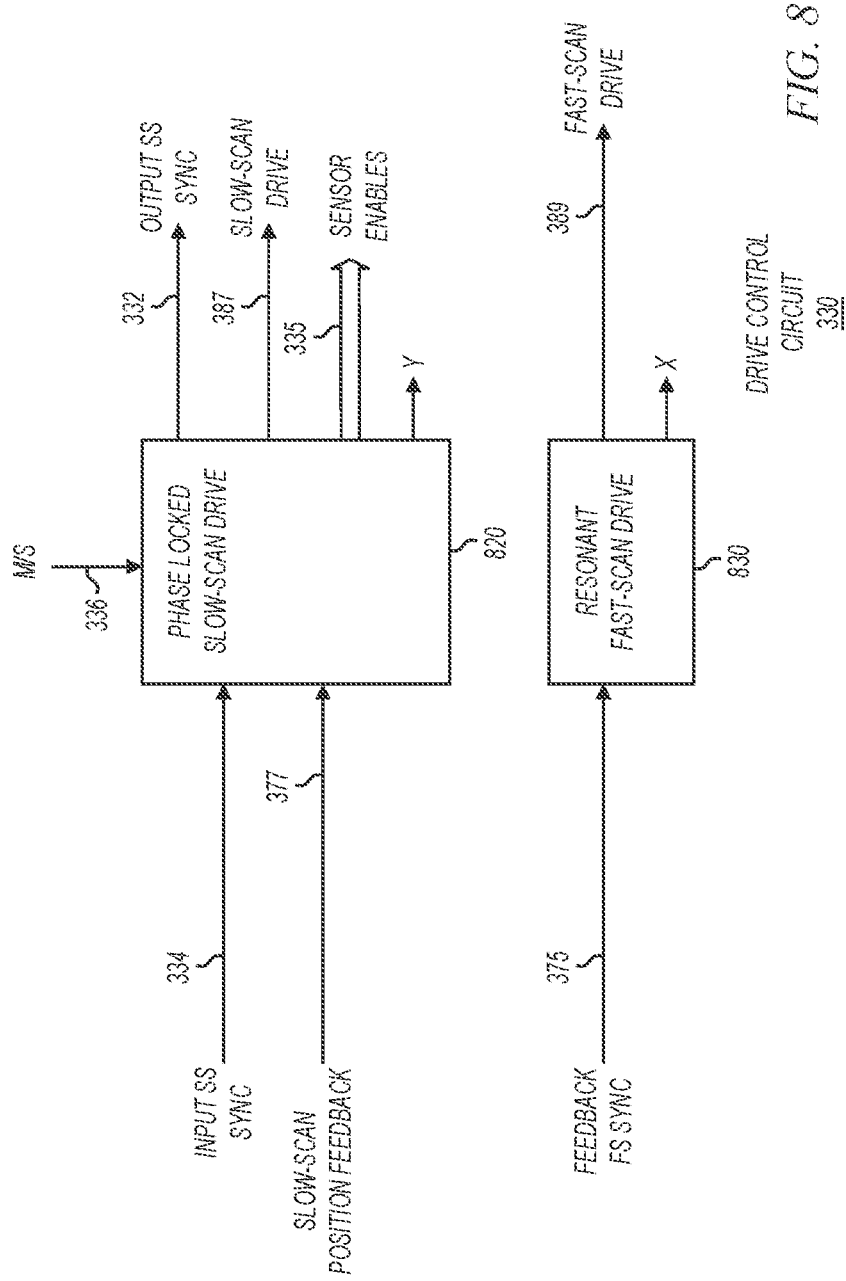
FIG. 8 shows a block diagram of a drive control circuit in accordance with various embodiments of the present invention.

FIG. 8 shows a block diagram of a drive control circuit in accordance with various embodiments of the present invention. Drive control circuit 330 includes phase locked slow-scan drive circuit 820 and resonant fast-scan drive circuit 830. Phase locked slow-scan drive circuit 820 produces the slow scan drive signal on node 387, and resonant fast-scan drive circuit 830 produces the fast-scan drive signal on node 389.

Resonant fast-scan drive circuit 830 provides periodic excitations to cause the scanning mirror to oscillate at the mechanical resonant frequency on the fast-scan axis. Resonant fast scan drive circuit 830 receives the feedback FS SYNC signal on node 375 as a feedback signal. Resonant fast scan drive circuit 830 includes a control circuit that may alter the timing or amplitude of its output signal as a function of the feedback FS SYNC signal.

Phase locked slow-scan drive circuit 820 provides the slow-scan drive signal on node 387 to cause the scanning mirror to sweep on the slow-scan axis. The slow-scan drive signal on node 387 works in combination with the mirror dynamics to result in the desired mirror movement on the slow-scan axis. Phase locked slow-scan drive circuit 820 receives the input SS SYNC signal on node 334 and the slow-scan position feedback signal from the scanning mirror on node 377. In some embodiments, phase locked slow-scan drive circuit 820 also receives the M/S signal on node 336. In some embodiments, phase locked slow-scan drive circuit 820 always phase locks the slow-scan drive signal on node 387 to the input SS SYNC to lock the slow-scan sweep of either scanning mirror 316 (FIGS. 3, 4) or scanning mirror 516 (FIGS. 5, 7) to the input SS SYNC. In other embodiments, phase locked slow-scan drive circuit 820 phase locks the slow-scan drive signal on node 387 to the input SS SYNC only when the M/S signal is set to S. When the M/S signal is set to S, phase locked slow-scan drive circuit 820 is slaved to the input SS SYNC.

In some embodiments, phase locked slow-scan drive circuit 820 provides the output SS SYNC signal on node 332. In these embodiments, other scanning LIDAR systems may phase lock their operation to the operation of this scanning LIDAR system. For example, if the M/S signal is set to M (master) on this scanning LIDAR system, the slow-scan drive of this system will not be phase locked to the input SS SYNC, and the output SS SYNC will provide other systems with a SYNC signal. Other scanning LIDAR systems may then be set to slave operation, and may receive the output SS SYNC on node 332 as their input SS SYNC to phase lock their slow scan drive signals to the slow-scan drive signal of this system on node 387.

Phase locked slow-scan drive circuit 820 also sources sensor enable signals 335. As shown in FIGS. 3 and 5, the sensor enable signals 335 may be used to electrically couple light sensors to a TOF detection circuit to time multiplex the use of a plurality of light sensors having different nonoverlapping fields of view.

Phase locked slow-scan drive circuit 820 and resonant fast-scan drive circuit 830 may be implemented in hardware, a programmable processor, or in any combination. For example, in some embodiments, phase locked slow-scan drive circuit 820 and resonant fast-scan drive circuit 830 are implemented with phase comparators, frequency multipliers and/or dividers, numerically controlled oscillators, loop filters, and the like. Also for example, phase locked slow-scan drive circuit 820 and resonant fast-scan drive circuit 830 may be implemented in an application specific integrated circuit (ASIC). Further, in some embodiments, some of the faster data path control is performed in an ASIC and overall control is provided by a software programmable microprocessor. The manner in which these circuits are implemented is not a limitation of the present invention.

Figure 9:
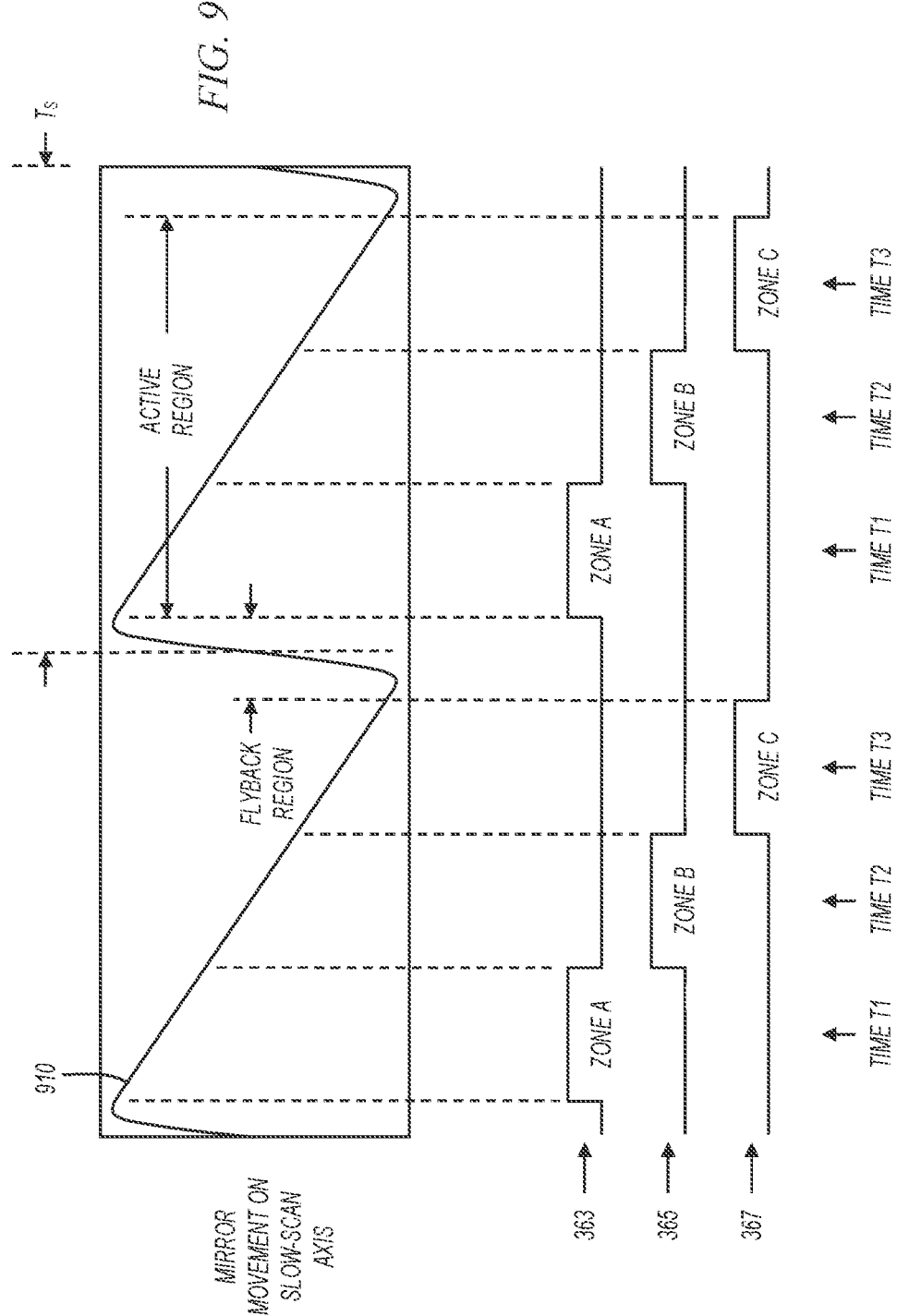
FIG. 9 shows a plot of mirror movement on the slow-scan axis in accordance with various embodiments of the present invention.

FIG. 9 shows a plot of mirror movement on the slow-scan axis in accordance with various embodiments of the present invention. The top plot in FIG. 6 shows non-resonant mirror movement on the slow-scan axis. Waveform 910 shows the mirror movement on the slow-scan axis having a period $T_S$. In some embodiments, this represents non-resonant motion of a biaxial mirror on a single axis (FIG. 3), and in other embodiments, this represents non-resonant motion of a single-axis mirror (FIG. 5).

In some embodiments, the frequency of movement on the slow-scan axis is deliberately chosen to be far from a resonant mode of the mirror, so that the period $T_S$ of movement on the slow-scan axis can be set more or less arbitrarily. For example, in some embodiments, the frequency of movement on the slow-scan axis is set to approximately 60 Hz, which is close to a common frame rate, although this is not a limitation of the present invention. For example, in some embodiments, the frequency of movement on the slow scan axis is 90 Hz, 120 Hz, or other frequency.

In some embodiments, the frequency of movement on the slow-scan axis is phase locked to an externally received signal. For example, when the M/S signal on node 336 (FIG. 8) is set to S, phase locked slow-scan drive 820 produces a slow-scan drive signal that causes mirror movement to be substantially phase locked to mirror movement of one or more other LIDAR systems that are locked to the same externally received signal.

Each period of movement on the slow-scan axis is divided into two regions: the active region, and the flyback region. During scanning in the active region, the mirror movement on the slow-scan axis follows a reference trajectory which is often substantially linear, and during scanning in the flyback region, the mirror movement on the slow-scan axis is generally nonlinear. During scanning in the flyback region, the movement on the slow-scan axis "flies back" to the start of the active region to ready for another active region scan. In some embodiments, laser light pulses are transmitted only during the active region, although this is not a limitation of the present invention.

During the active region, the mirror scans through the angular extents in the slow-scan direction. As shown in FIG. 9, the active region is split into a plurality of zones, where each zone corresponds to a substantially nonoverlapping sensor field of view. For example, Zone A corresponds to the field of view of sensor 120, Zone B corresponds to the field of view of sensor 130, and Zone C corresponds to the field of view of sensor 140.

Sensor enable signals 363, 365, and 367 control which sensor is active at any given time. For example, sensor enable signal 363 is asserted at time T1, corresponding to the time in which transmit pulses are in Zone A, sensor enable signal 365 is asserted at time T2, corresponding to the time in which transmit pulses are in Zone B, and sensor enable signal 367 is asserted at time T3, corresponding to the time in which transmit pulses are in Zone C.

Three Zones and three sensor enable signals are shown in FIG. 9, corresponding to three sensors that are time multiplexed during the slow-scan sweep, although this is not a limitation of the present invention. For example, some embodiments include more or less than three sensors, three zones, and three sensor enable signals.

Figure 10:
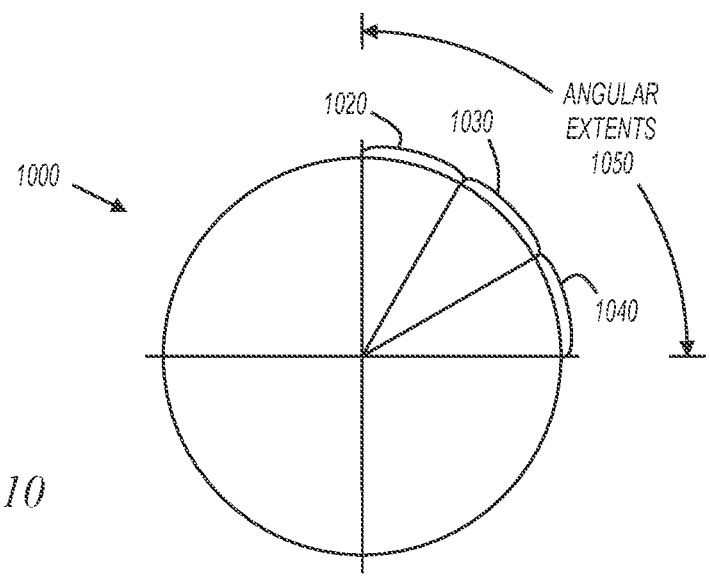
FIG. 10 shows a top view of nonoverlapping sensor fields of view in accordance with various embodiments of the present invention.

FIG. 10 shows a top view of nonoverlapping sensor fields of view in accordance with various embodiments of the present invention. Top view 1000 shows the horizontal angular extents and sensor fields of view as viewed from above LIDAR system 100 (FIG. 1), where the system is located at the origin of plot 1000. For example, in some embodiments, angular extents 1050 correspond to the horizontal angular extents of movement of mirror 316 on the slow scan axis (FIGS. 3, 4), and in other embodiments, angular extents 1050 correspond to the angular extents of movement of mirror 516 (FIGS. 5, 7). Also for example, field of view 1020 corresponds to the field of view of sensor 120, field of view 1030 corresponds to the field of view of sensor 130, and field of view 1040 corresponds to the field of view of sensor 140.

In the example of FIG. 10, angular extents 1050 are substantially equal to 90 degrees, and the fields of view of the sensors are each substantially equal to 30 degrees. In some embodiments, the angular extents are greater than 90 degrees and in other embodiments, the angular extents are less than 90 degrees. For example, in some embodiments, the angular extents are substantially equal to 120 degrees, and in other embodiments, the angular extents are substantially equal to 60 degrees. Similarly, in some embodiments, the field of view of each sensor is greater than 30 degrees, an in other embodiments, the field of view of each sensor is less than 30 degrees.

Figure 11:
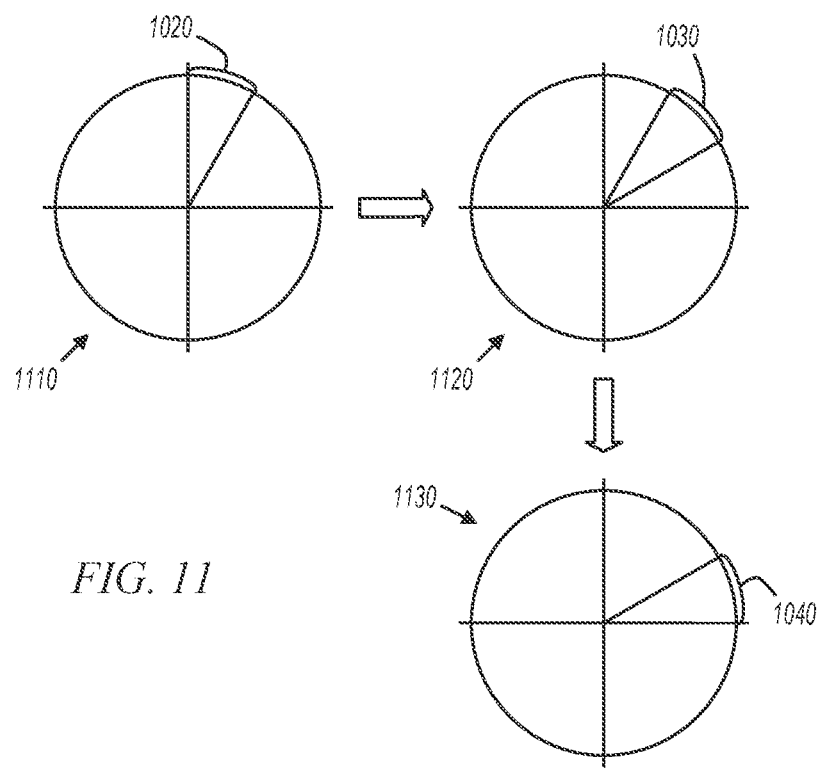
FIG. 11 shows top views of nonoverlapping sensor fields of view multiplexed in time in accordance with various embodiments of the present invention.

FIG. 11 shows top views of nonoverlapping sensor fields of view multiplexed in time in accordance with various embodiments of the present invention. Top view 1110 shows field of view 1020 of sensor 120 at time T1. As described above with reference to FIG. 9, at time T1, transmit pulses are in zone A, and sensor enable signal 363 is asserted to enable sensor 120, which has a field of view corresponding to zone A. Top view 1120 shows field of view 1030 of sensor 130 at time T2. As described above with reference to FIG. 9, at time T2, transmit pulses are in zone B, and sensor enable signal 365 is asserted to enable sensor 130, which has a field of view corresponding to zone B. Top view 1130 shows field of view 1040 of sensor 140 at time T3. As described above with reference to FIG. 9, at time T3, transmit pulses are in zone C, and sensor enable signal 367 is asserted to enable sensor 140, which has a field of view corresponding to zone C.

As the slow-scan mirror movement moves through the angular extents, the transmit pulses and sensor fields of view progress through time as shown in plots 1120, 1130, and 1140.

Figure 12:
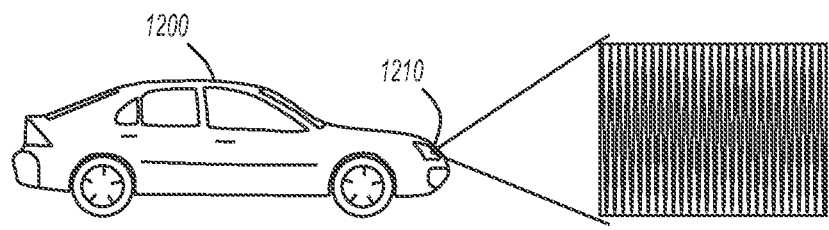
FIGS. 12 and 13 show automotive applications of scanning light detection and ranging systems accordance with various embodiments of the present invention.
Figure 13:
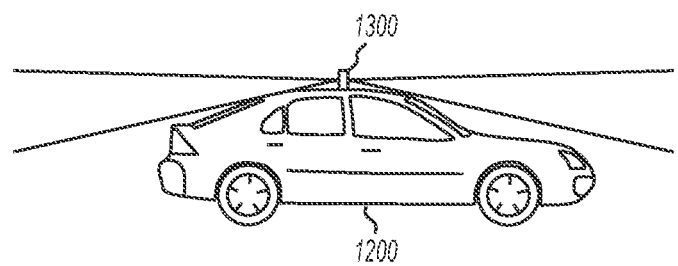

FIGS. 12 and 13 show automotive applications of scanning light detection and ranging systems accordance with various embodiments of the present invention. In FIG. 12, vehicle 1200 includes LIDAR system 1210 at the front of the vehicle. LIDAR system 1210 may be any LIDAR system with multiplexed sensor operation as described herein. In some embodiments, the horizontal angular extents of LIDAR system 1210 may be substantially equal to 90 degrees. In other embodiments, the horizontal angular extents may be greater, such as 120 degrees, or 180 degrees.

In FIG. 13, vehicle 1200 includes LIDAR system 1300 located on the vehicle such that LIDAR system 1300 has an effective angular extents of 360 degrees. Example embodiments of LIDAR systems with effective angular extents of 360 degrees are further described below.

Figure 14:
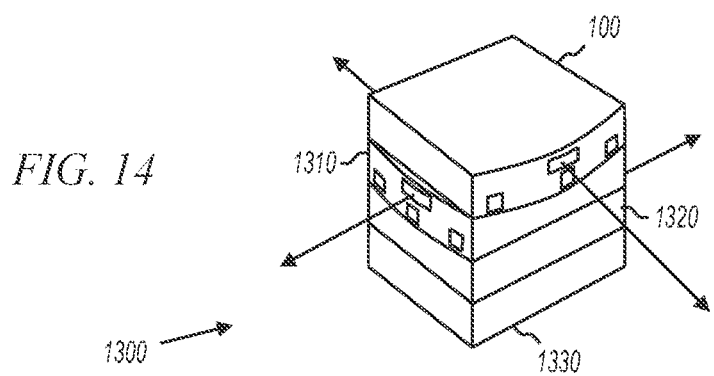
FIG. 14 shows a light detection and ranging system that includes multiple scanning light detection and ranging modules in accordance with various embodiments of the present invention.

FIG. 14 shows a light detection and ranging system that includes multiple scanning light detection and ranging modules in accordance with various embodiments of the present invention. Scanning LIDAR system 1300 includes four identical scanning LIDAR modules 100, 1310, 1320, and 1330. Each scanning LIDAR module has horizontal angular extents of substantially 90 degrees, and each if offset by 90 degrees to provide an effective angular extents of 360 degrees. In some of the embodiments represented by FIG. 14, one of the scanning LIDAR modules operates as a master and the remaining LIDAR modules operate as slaves that are phase locked to the first scanning LIDAR module, and in other embodiments, all of the scanning LIDAR modules operate as slaves and are phase locked to an external sync signal.

In some embodiments, two or more of the scanning LIDAR modules 100, 1310, 1320, and 1330 emit light at different wavelengths. For example, in some embodiments, the top module (100) may emit light at 850 nanometers (nm), and the second module (1310) may emit light at 940 nm. The sensors for each module may then use optical bandpass filters on the sensors specific to the laser being used. In some embodiments, module 1320 may emit light at the same wavelength as module 100 since its field of view is 180 degrees rotated with minimal probability of crosstalk. Likewise, modules 1310 and 1330 could use the same laser wavelength. In some embodiments, all four modules emit a different wavelength of light.

Figure 15:
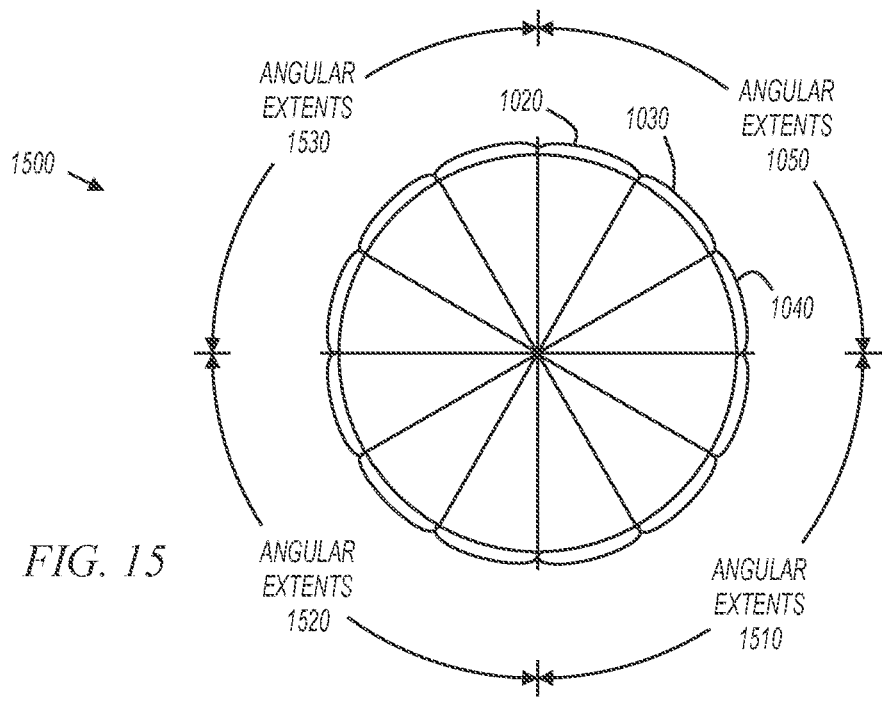
FIG. 15 shows a top view of nonoverlapping sensor fields of view in accordance with various embodiments of the present invention.

FIG. 15 shows a top view of nonoverlapping sensor fields of view in accordance with various embodiments of the present invention. Top view 1500 shows the same angular extents 1050 and sensor fields of view 1020, 1030, and 1040 as shown in FIG. 10. These angular extents and sensor fields of view correspond to scanning LIDAR module 100 (FIG. 13). Plot 1500 also shows angular extents 1510 which correspond to scanning LIDAR module 1310 (FIG. 14), angular extents 1520 which correspond to scanning LIDAR module 1320 (FIG. 14), and angular extents 1530 which correspond to scanning LIDAR module 1330 (FIG. 14).

Figure 16:
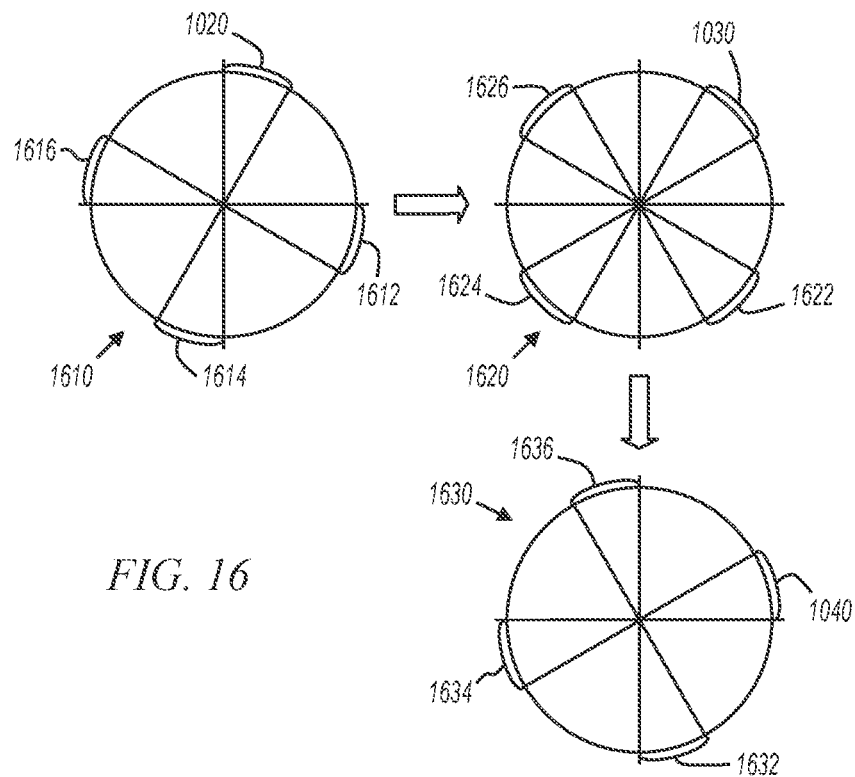
FIG. 16 shows top views of nonoverlapping sensor fields of view multiplexed in time in accordance with various embodiments of the present invention.

FIG. 16 shows top views of nonoverlapping sensor fields of view multiplexed in time in accordance with various embodiments of the present invention. Similar to FIG. 11, plots 1610, 1620, and 1630 show the fields of view of enabled sensors as time progresses from time T1 to time T2, and to time T3. During time T1, sensors having fields of view 1020, 1612, 1614, and 1616 are enabled. During time T2, sensors having fields of view 1030, 1622, 1624, and 1626 are enabled. And during time T3, sensors having fields of view 1040, 1632, 1634, and 1636 are enabled.

The operation of multiple scanning LIDAR modules as shown in FIG. 16 may be achieved when all modules are acting as slaves phase locked to a common sync signal, or when one is acting as a master and the rest as slaves.

Figure 17:
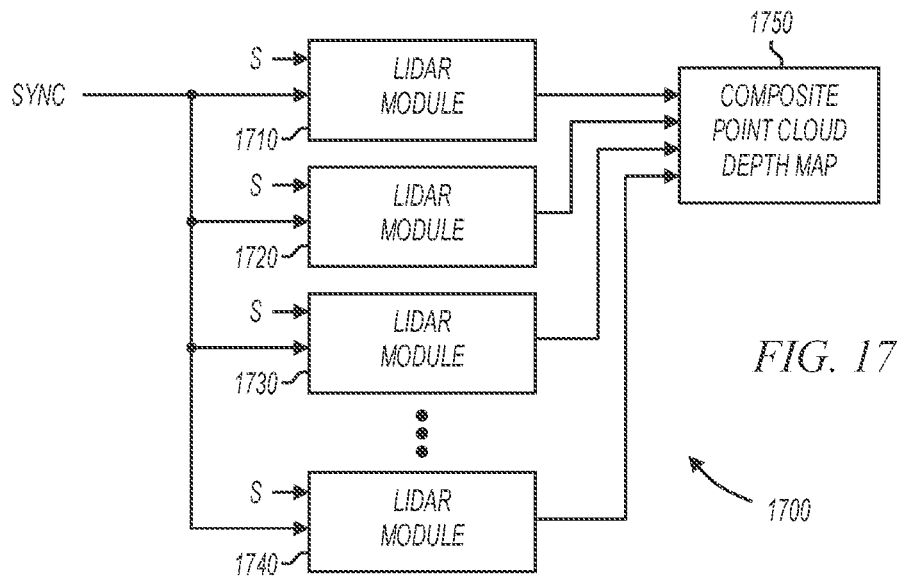
FIGS. 17 and 18 show a plurality of light detection and ranging systems having slow-scan movements phase locked to a single sync signal.
Figure 18:
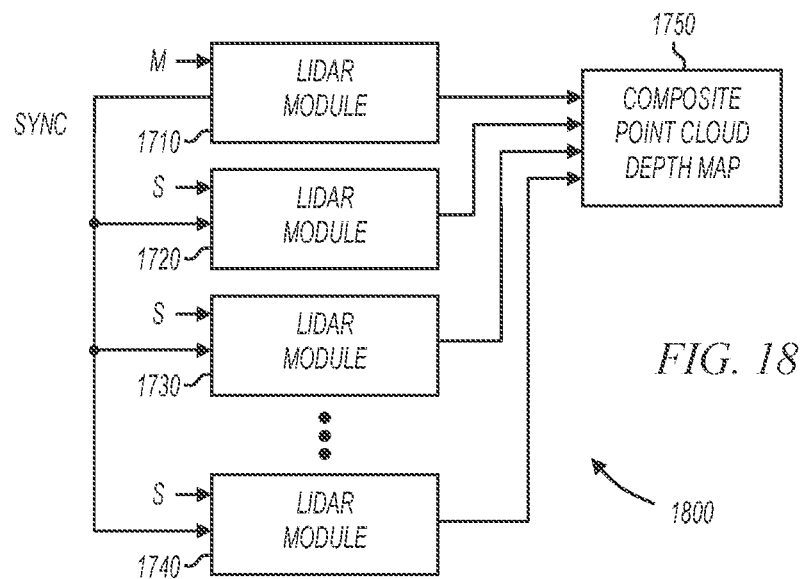

FIGS. 17 and 18 show a plurality of light detection and ranging systems having slow-scan movements phase locked to a single sync signal. FIG. 17 shows LIDAR system 1700 including scanning LIDAR modules 1710, 1720, 1730, and 1740 all having slow-scan axes phase locked to a single externally provided SYNC signal. The scanning LIDAR modules may be any of the scanning LIDAR systems described herein. For example, scanning LIDAR system 1700 may be an implementation of scanning LIDAR system 1300 (FIGS. 13, 14).

Each of scanning LIDAR modules has its M/S signal set to S, so that they all phase lock the timing of the slow-scan movement and sensor enable signals to the common external SYNC signal. The external SYNC signal may be from any source. For example, in some embodiments, scanning LIDAR system 1700 phase locks to a SYNC provided by a projector, a camera, another depth sensor, a system control computer, or the like.

Scanning LIDAR system 1700 also includes composite point cloud depth map storage 1750. Composite point cloud depth map storage 1750 receives point cloud depth map information from each of scanning LIDAR modules 1710, 1720, 1730, and 1740 to produce a larger, composite, point cloud depth map. For example, when each of scanning LIDAR modules 1710, 1720, 1730, and 1740 have angular extents of substantially 90 degrees, then composite point cloud depth map storage 1750 may store data with an effective angular extents of 360 degrees. Also for example, when two scanning LIDAR modules are included, each having 60 angular extents, then composite point cloud depth map storage 1750 may store data with an effective angular extents of 120 degrees. Any number of scanning LIDAR modules, each with any angular extents, and each with any number of sensors with any size field of view may be included without departing from the scope of the present invention.

FIG. 18 shows scanning LIDAR system 1800 including scanning LIDAR modules 1710, 1720, 1730, and 1740. Scanning LIDAR system 1800 is similar to scanning LIDAR system 1700 (FIG. 17) with the exception that scanning LIDAR module 1710 has the M/S input set to M, so that scanning LIDAR module 1710 does not phase lock to an external SYNC signal. Instead, scanning LIDAR module 1710 sources the SYNC signal to which the remaining scanning LIDAR modules phase lock their slow-scan movement.

Figure 19:
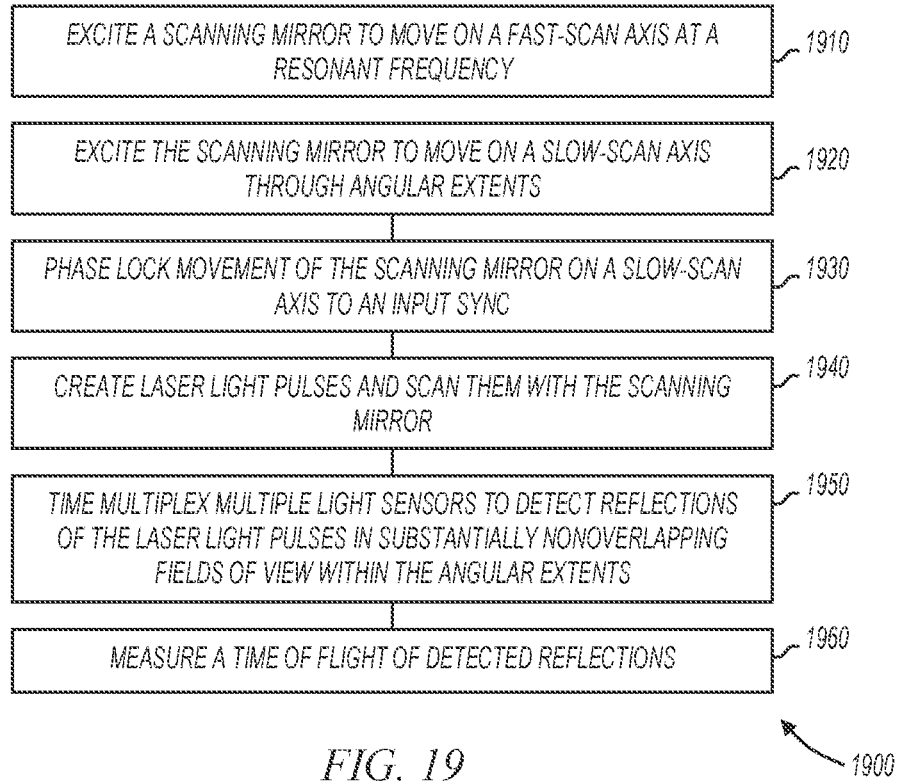
FIGS. 19 and 20 show flow diagrams of methods in accordance with various embodiments of the present invention.

FIG. 19 shows a flow diagram of methods in accordance with various embodiments of the present invention. In some embodiments, method 1900, or portions thereof, is performed by a scanning LIDAR system or a scanning LIDAR module. In other embodiments, method 1900 is performed by a series of circuits or an electronic system. Method 1900 is not limited by the particular type of apparatus performing the method. The various actions in method 1900 may be performed in the order presented, or may be performed in a different order. Further, in some embodiments, some actions listed in FIG. 19 are omitted from method 1900.

Method 1900 is shown beginning with block 1910. As shown at 1910, a scanning mirror is excited to move on a fast-scan axis at a resonant frequency. In some embodiments, this corresponds to resonant fast-scan drive circuit 830 (FIG. 8) producing a fast-scan drive signal to excite movement of mirror 316 (FIGS. 3, 4) at a resonant frequency. In other embodiments, this corresponds to resonant fast-scan drive circuit 830 (FIG. 8) producing a fast-scan drive signal to excite movement of mirror 526 (FIGS. 5, 6) at a resonant frequency. At 1920, the scanning mirror is excited to move on a slow-scan axis through angular extents. In some embodiments, this corresponds to phase locked slow-scan drive circuit 820 (FIG. 8) producing a slow-scan drive signal to excite movement of mirror 316 (FIGS. 3, 4)

on the slow-scan axis. In other embodiments, this corresponds to phase locked slow-scan drive circuit 820 (FIG. 8) producing a slow-scan drive signal to excite movement of mirror 516 (FIGS. 5, 7).

At 1930, movement of the scanning mirror on the slow-scan axis is phase locked to an input SYNC signal. In some embodiments, this corresponds to phase locked slow-scan drive circuit 820 (FIG. 8) phase locking movement of mirror 316 (FIGS. 3, 4) to the input SS SYNC received on node 334. In other embodiments, this corresponds to phase locked slow-scan drive circuit 820 (FIG. 8) phase locking movement of mirror 526 (FIGS. 5, 7) to the input SS SYNC received on node 334.

At 1940, laser light pulses are created and scanned with the scanning mirror. In some embodiments, this corresponds to IR light source 310 creating IR laser light pulses and either scanning mirror 316 or scanning mirrors 516/526 scanning the IR laser light pulses through the angular extents in the horizontal direction.

At 1950, multiple light sensors are time multiplexed to detect reflections of the laser light pulses in substantially nonoverlapping fields of view within the angular extents. This corresponds to drive control circuit 330 enabling light sensors 120, 130, and 140 at different points in time to detect reflections within their respective nonoverlapping fields of view. At 1960, the time of flight of detected reflections are measured to generate a point cloud depth map.

Figure 20:
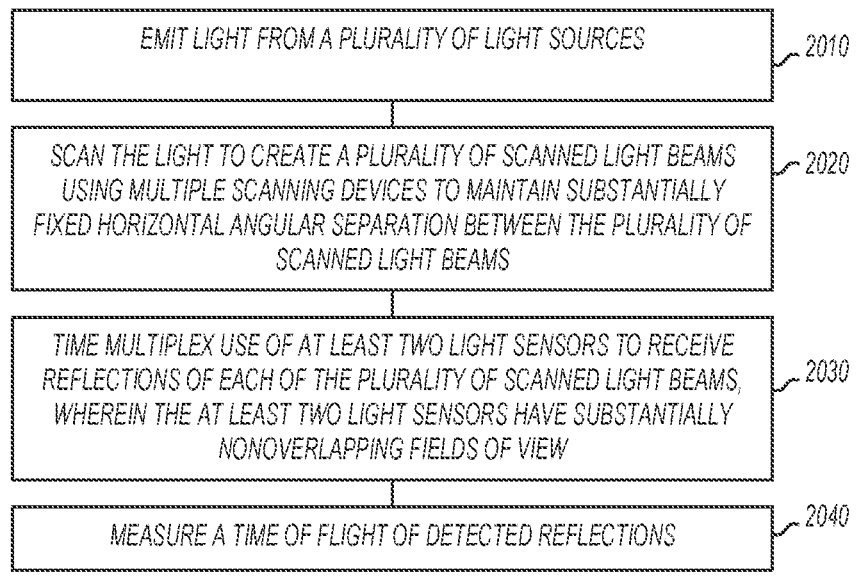

FIG. 20 shows a flow diagram of methods in accordance with various embodiments of the present invention. In some embodiments, method 2000, or portions thereof, is performed by a scanning LIDAR system that includes multiple scanning LIDAR modules. In other embodiments, method 2000 is performed by a series of circuits or an electronic system. Method 2000 is not limited by the particular type of apparatus performing the method. The various actions in method 2000 may be performed in the order presented, or may be performed in a different order. Further, in some embodiments, some actions listed in FIG. 20 are omitted from method 2000.

Method 2000 is shown beginning with block 2010. As shown at 2010, light is emitted from a plurality of light sources. In some embodiments, this corresponds to light sources within a plurality of scanning LIDAR modules. For example, each of scanning LIDAR modules 100, 1310, 1320, and 1330 (FIG. 14) each include a light source that emits IR laser light pulses.

In some embodiments, the light sources use different wavelengths to increase isolation between different module receivers. For example, referring back to FIG. 14, module 100 mau operate at laser wavelength L1, module 1310 may operate using a laser at L2 and so forth. This provides further signal isolation to prevent crosstalk between modules.

At 2020, the light is scanned to create a plurality of scanned light beams using multiple scanning devices to maintain substantially fixed horizontal angular separation between the plurality of scanned light beams. This corresponds to the operation of multiple scanning LIDAR modules that have phase locked slow-scan movement. For example, in the example of FIG. 14, where four scanning laser modules are included and each has a 90 degree fixed offset, the scanned beams will maintain a substantially fixed horizontal angular separation of 90 degrees.

At 2030, at least two light sensors are time multiplexed to receive reflections of each of the plurality of scanned light beams, wherein the at least two light sensors have substantially nonoverlapping fields of view. This corresponds to each of scanning LIDAR modules 100, 1310, 1320, and 1330, having three light sensors with substantially nonoverlapping fields of view as described above with reference to FIGS. 10, 11, 15, and 16. At 2040, the time of flight of detected reflections are measured to generate a point cloud depth map. In some embodiments, the point cloud depth maps from multiple scanning LIDAR modules are combined to create a composite point cloud depth map as described above with reference to FIGS. 17 and 18.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A light detection and ranging system comprising:
a laser light source;
a scanning mirror positioned to reflect laser light pulses from the laser light source, the scanning mirror configured to scan the laser light pulses to angular extents over a scanning area, wherein the scanning area comprises a plurality of substantially nonoverlapping zones;
a plurality of light sensors, each of the plurality of light sensors including optics having a substantially nonoverlapping horizontal field of view that corresponds to one of the plurality of substantially nonoverlapping zones such that each of the plurality of light sensors is configured to receive the laser light pulses reflected from the corresponding one of the plurality of substantially nonoverlapping zones; and
a time-of-flight (TOF) detection circuit coupled to the plurality of light sensors to measure TOF of the received laser light pulses.

2. The light detection and ranging system of claim 1 further comprising a control circuit to time multiplex an electrical coupling between the plurality of light sensors and the TOF detection circuit.

3. The light detection and ranging system of claim 2 wherein the time multiplexing of the electrical coupling between the plurality of light sensors and the TOF detection circuit is phase locked to the scanning over the plurality of substantially nonoverlapping zones in the scanning area.

4. The light detection and ranging system of claim 2 wherein the scanning mirror comprises a single biaxial scanning mirror configured to scan in a vertical direction at a resonant frequency, and to scan to the angular extents in a horizontal direction under control of the control circuit.

5. The light detection and ranging system of claim 2 wherein the scanning mirror comprises a first scanning mirror configured to scan at a resonant mode in a vertical direction, and a second scanning mirror to scan to the angular extents in a horizontal direction under control of the control circuit.

6. The light detection and ranging system of claim 1 wherein the scan to angular extents over a scanning area is phase locked to an external signal.

7. The light detection and ranging system of claim 1 wherein each of plurality of substantially nonoverlapping zones spans substantially 90 degrees of the angular extents.

8. The light detection and ranging system of claim 1 wherein each of plurality of substantially nonoverlapping zones spans less than 90 degrees of the angular extents.

9. The light detection and ranging system of claim 1 wherein the plurality of light sensors comprises three light sensors.

10. The light detection and ranging system of claim 1 wherein the plurality of light sensors comprises more than three light sensors.

11. A light detection and ranging system including a plurality of modules, wherein each of the plurality of modules comprises:

a scanning mirror to scan laser light pulses through angular extents over a scanning area where the scanning area comprises a plurality of substantially nonoverlapping zones;

multiple light sensors, each of the multiple light sensors having a substantially nonoverlapping horizontal field of view that corresponds to one of the plurality of substantially nonoverlapping zones such that each of the multiple light sensors is configured to receive the laser light pulses reflected from the corresponding one of the plurality of substantially nonoverlapping zones; and a time-of-flight (TOF) detection circuit coupled to the multiple light sensors to measure TOF of the received laser light pulses.

12. The light detection and ranging system of claim 11 wherein the plurality of modules comprises four modules, each having angular extents over the scanning area of substantially 90 degrees.

13. The light detection and ranging system of claim 11 wherein the plurality of modules comprises six modules, each having angular extents over the scanning area of substantially 60 degrees.

14. The light detection and ranging system of claim 11 wherein the scanning mirror to scan laser light pulses comprises a scanning mirror that is resonant on a first axis, and non-resonant on a second axis, wherein the scanning mirror scans through the angular extents over the scanning area on the second axis.

15. The light detection and ranging system of claim 14 wherein non-resonant movement on the second axis of each apparatus to scan laser light pulses is phase locked to a common signal.

16. The light detection and ranging system of claim 15 wherein the common signal is sourced by one of the plurality of modules.

17. The light detection and ranging system of claim 11 wherein the scanning mirror to scan laser light pulses comprises a first mirror to scan at a resonant mode and a second mirror to scan through the angular extents over the scanning area.

18. The light detection and ranging system of claim 11 wherein the plurality of modules comprises a first module to create laser light pulses at a first wavelength and a second module to create laser light pulses at a second wavelength.

* * * * *